July 14, 1942. J. W. MARSHALL 2,289,587
BRAKE SHOE
Filed Aug. 9, 1941
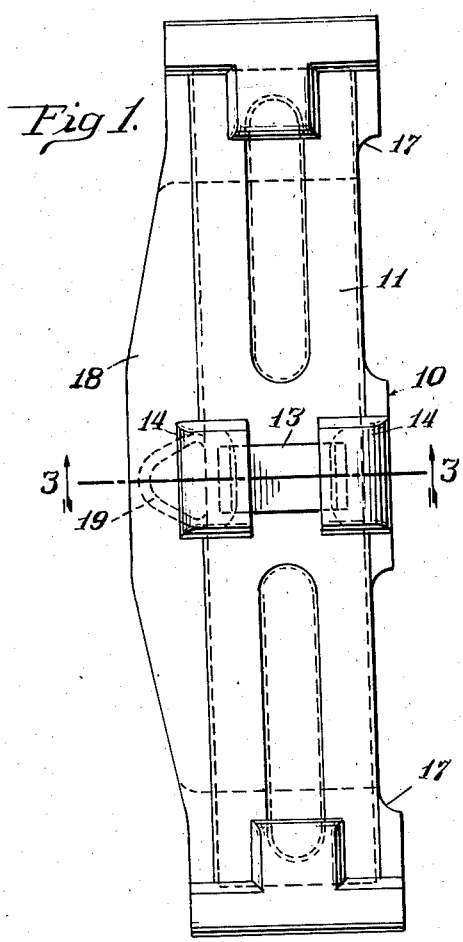
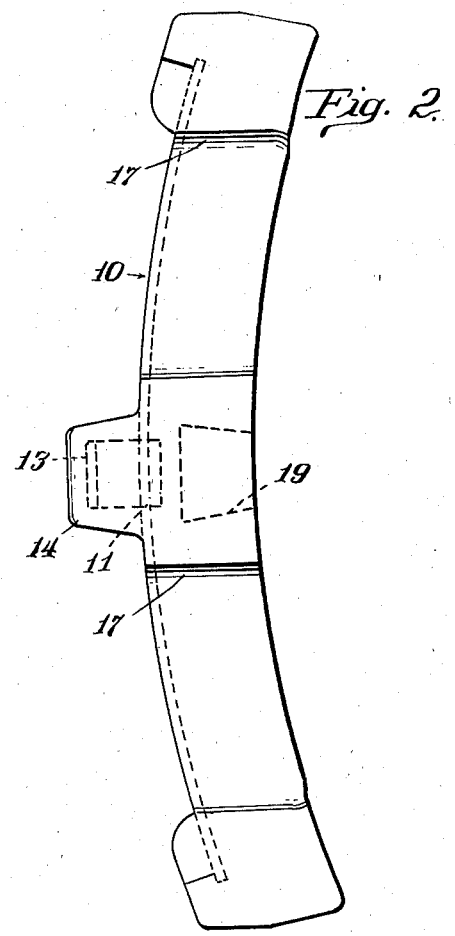
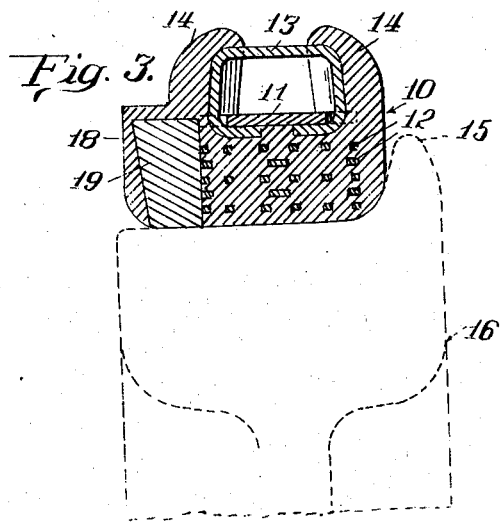
Inventor
Joseph Warren Marshall,
By George Heideman
Attorney Patented July 14, 1942

2,289,587

UNITED STATES PATENT OFFICE 2,289,587

BRAKE SHOE

Joseph Warren Marshall, Milwaukee, Wis.

Application August 9, 1941, Serial No. 406,113

1 Claim. (Cl. 188—255)

My invention relates more particularly to brake shoes of railroad cars and has for its objects the provision of a shoe, constructed along the general lines of the standard shoes, adapted to dissipate or eliminate the heat from the flange of the wheel and whereby the brake shoe area is increased and the tread of the wheel maintained at a uniform contour.

With brake shoes as at present employed, in addition to the excessive heat obtained at the flange of the wheel, recesses are worn into the treads of the wheels intermediate the flanges and the outsides of the wheels with the result that the wheels tend to pound on the rail joints because of the high shoulders or rims left by the recesses, causing excess wear and the tread to mushroom or batter out sidewise.

My improved brake shoe is designed to overcome these objectionable conditions and to provide increased wheel tread contacting or braking area and added strength on the sides of the lugs of the shoe.

The objects and advantages as well as other advantages inherent in the invention will all be readily comprehended from the following detailed description of the accompanying drawing wherein:

Figure 1 is a rear view of my improved brake shoe.

Figure 2 is a side elevation of the shoe as viewed from the left in Figure 1.

Figure 3 is a cross section taken on the line 3—3 of Figure 1, illustrating application to a wheel tread of which only a portion is shown.

In the particular exemplification of the invention, the brake shoe 10 is constructed along the lines of the standard shoe, being provided with the usual sheet steel back 11, shown in dotted lines in Figures 1 and 2, and the generally employed expanded metal insert indicated at 12, preferably coated with a heat resisting material before being placed in the mold; the steel back 11, the expanded metal 12 and the usual key holding strap 13 (whose ends are embedded in the lugs 14, 14) are all cast into the shoe. The elements mentioned all constitute a part of the usual brake shoe at present employed, which is provided with a continuous straight inner side presented toward and in engagement with the flange 15 of the wheel of which a portion is shown at 16 in Figure 3; while the outer side of the shoe is usually flush with the outer perimeters of the toes or ends of the shoe.

In practice, the standard shoe (constructed as just defined) and the ball of the rail are approximately three and three-eighths inches in width, while the wheel tread is four and a quarter inches wide, and hence the shoe merely contacts a portion of the wheel tread and causes a hollow or recess to be worn into the wheel tread intermediate the wheel flange and the outer peripheral edge of the wheel, thereby producing an annular shoulder or rim at the outer side of the tread. This dished and shouldered tread causes the wheel to pound on the rail joints and the shoulder or rim ultimately to batter out sidewise or mushroom.

Furthermore, with the continuous or straight inner side of the shoe in contact with the flange of the wheel, the heat generated by the frictional contact cannot be dissipated but is trapped as it were. As a result the wheel flange becomes excessively worn and materially weakened.

In order to overcome these serious difficulties I dish out or recess the inner side of the shoe, as shown for example at 17 in Figure 1, intermediate the toes or ends and the transverse central portion of the shoe, thereby reducing the frictional contact with the wheel flange and providing spaces for the radiation and dissipation of the generated heat. As a result, wear on the flanges of the wheel is prevented or materially reduced and the resultant wheel flange breakage eliminated.

The outer longitudinal side of the shoe, intermediate the ends of the shoe, is laterally increased from both ends toward the transverse axis of the shoe as shown at 18; the laterally extended portion 18 preferably gradually increasing from opposite ends toward the transverse axis of the shoe thereby providing a braking surface substantially coextensive with the width of the wheel tread. The extension 18, at its point of maximum width, namely coincident with the transverse axis of the shoe, is provided with a wear resisting element or insert 19, in the form of a high manganese, high Brinell and preferably tapered solid plug as shown in Figure 3.

The extension 18 may be formed by curving or sloping the outside of the shoe gradually toward the center as shown, or the extension may simply project laterally from the side of the shoe.

As a result of the construction just defined, the braking area of the shoe is increased and the tread of the wheel, namely the portion which does not contact the rail, is maintained at or kept to a uniform contour and the dishing or wearing of a groove in the wheel tread prevented; and at the same time the period of usefulness of the wheel is enhanced by providing the inner side of the shoe with heat dissipating or radiating spaces or recesses, which may be tapered or rounded; a construction which also eliminates or reduces wear on the flanges of the wheels.

The improved shoe produces a more uniform or even tread on the wheels which in turn affords the required lateral for the wheels in rounding curves, thereby eliminating a large percentage of broken flanges.

The exemplification is believed to be the best embodiment of the invention adapted to perform the functions heretofore described, but modifications may be made without, however, departing from the spirit of the invention as defined in the appended claim.

What I claim is:

A brake shoe adapted to contact the tread of a car-wheel intermediate the base of the wheel-flange and the outside of the wheel, the wheel-tread engaging portion on the outer longitudinal side of the shoe being of increased width at the transverse median line of the shoe to provide a wheel-tread engaging area at said median line disposed laterally beyond the vertical plane of the shoe-ends; a plug of wear resisting metal embedded in said laterally enlarged portion coincident with the transverse median line of the shoe and arranged to extend beyond the vertical plane of the shoe ends; the inner longitudinal side of the shoe which contacts the base of the wheel-flange being provided with laterally disposed heat dissipating recesses intermediate the ends and the transverse median line of the shoe.

JOSEPH WARREN MARSHALL.